US012447754B2

(12) United States Patent
Tani et al.

(10) Patent No.: US 12,447,754 B2
(45) Date of Patent: Oct. 21, 2025

(54) NAIL PRINTING APPARATUS

(71) Applicant: CANON KABUSHIKI KAISHA, Tokyo (JP)

(72) Inventors: Yuka Tani, Tokyo (JP); Toshiaki Tokisawa, Kanagawa (JP); Soma Nakai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/706,670

(22) Filed: Mar. 29, 2022

(65) Prior Publication Data

US 2022/0314638 A1 Oct. 6, 2022

(30) Foreign Application Priority Data

Apr. 5, 2021 (JP) ................................ 2021-064098

(51) Int. Cl.
*B41J 3/407* (2006.01)

(52) U.S. Cl.
CPC .................................. *B41J 3/4073* (2013.01)

(58) Field of Classification Search
None
See application file for complete search history.

(56) References Cited

U.S. PATENT DOCUMENTS

| | | | | |
|---|---|---|---|---|
| 8,721,068 | B2 | 5/2014 | Yamasaki | |
| 2012/0147113 | A1* | 6/2012 | Yamasaki | B41J 3/407 347/104 |
| 2012/0164330 | A1* | 6/2012 | Swanson | B29C 64/106 427/258 |
| 2017/0273433 | A1* | 9/2017 | Hori | A45D 34/04 |
| 2021/0386179 | A1* | 12/2021 | Yilmaz | A45D 34/04 |

FOREIGN PATENT DOCUMENTS

| | | | | |
|---|---|---|---|---|
| JP | 2012135600 A | | 7/2012 | |
| WO | WO-2020091704 A1 | * | 5/2020 | A45D 29/00 |

OTHER PUBLICATIONS

Hirokazu Kameda, U.S. Appl. No. 17/701,811, filed Mar. 23, 2022.
Soma Nakai et al., U.S. Appl. No. 17/706,728, filed Mar. 29, 2022.
Keisuke Arita et al., U.S. Appl. No. 17/690,113, filed Mar. 9, 2022.
Naoya Ogawa et al., U.S. Appl. No. 17/695,887, filed Mar. 16, 2022.

* cited by examiner

*Primary Examiner* — Erica S Lin
(74) *Attorney, Agent, or Firm* — VENABLE LLP

(57) ABSTRACT

A nail printing apparatus includes a finger-disposing unit on which a printing finger which is a finger with a nail portion on which printing an image is to be performed is to be disposed and which is capable of being elevated and lowered, and an abutting member to, in a case where the printing finger is inserted, abut a near-tip portion of the inserted printing finger. A print unit performs printing on the nail portion. In a case where the printing finger is inserted, the finger-disposing unit and the abutting member slide in an insertion direction of the printing finger.

20 Claims, 8 Drawing Sheets

NAIL PRINTING APPARATUS

BACKGROUND OF THE INVENTION

Field of the Invention

The present invention relates to a nail printing apparatus.

Description of the Related Art

A nail printing apparatus for printing a nail design is known. A nail printing apparatus disclosed in Japanese Patent Laid-Open No. 2012-135600 (hereinafter, referred to as Literature 1) includes a finger insertion member including a finger-pressing unit configured to constrain a printing finger so that a nail during printing does not move and an abutting member on which a tip of the printing finger abuts in a case where the printing finger is inserted. Literature 1 also discloses a technique in which in order to approach a difference in length among users or fingers, the finger insertion member moves in a finger insertion direction to constrain the printing finger without changing a positional relationship between the nail and the finger-pressing unit. Literature 1 also discloses a lifting mechanism for lifting up the printing finger so as to cause the printing finger to approach a print head.

In the case of performing high-definition printing on a nail portion, it is necessary to arrange the nail portion in a fixed position relative to a print head. The technique in Literature 1 has difficulty in elevating and lowering the near-nail-portion parts of fingers of various lengths to a fixed position.

SUMMARY OF THE INVENTION

A nail printing apparatus according to one aspect of the present invention is a nail printing apparatus, the nail printing apparatus including a finger-disposing unit on which a printing finger which is a finger with a nail portion on which printing an image is to be performed is to be disposed and which is capable of being elevated and lowered and an abutting member configured to, in a case where the printing finger is inserted, abut a near-tip portion of the inserted printing finger, wherein in a case where the printing finger is inserted, the finger-disposing unit and the abutting member slide in an insertion direction of the printing finger.

Further features of the present invention will become apparent from the following description of exemplary embodiments with reference to the attached drawings.

DESCRIPTION OF THE EMBODIMENTS

A description will be given in detail of an example of embodiments with reference to the accompanying drawings. It should be noted that the following embodiments do not limit the present invention, and not all combinations of features described in the present embodiments are necessarily essential to a solving means of the present invention. The relative positions, shapes, and the like of constituents described in the embodiments are merely examples, and the scope of the present invention is not intended to be limited only to them.

First Embodiment

<Nail Printing Apparatus>

A printing apparatus of the present embodiment is a nail printing apparatus for printing a nail design on a nail. In the embodiment below, a description will be given on the presumption that a user of the nail printing apparatus is a subject of printing who has nails on which a nail design is to be printed. The user of the nail printing apparatus and the subject of printing may be different persons.

Figure 1:
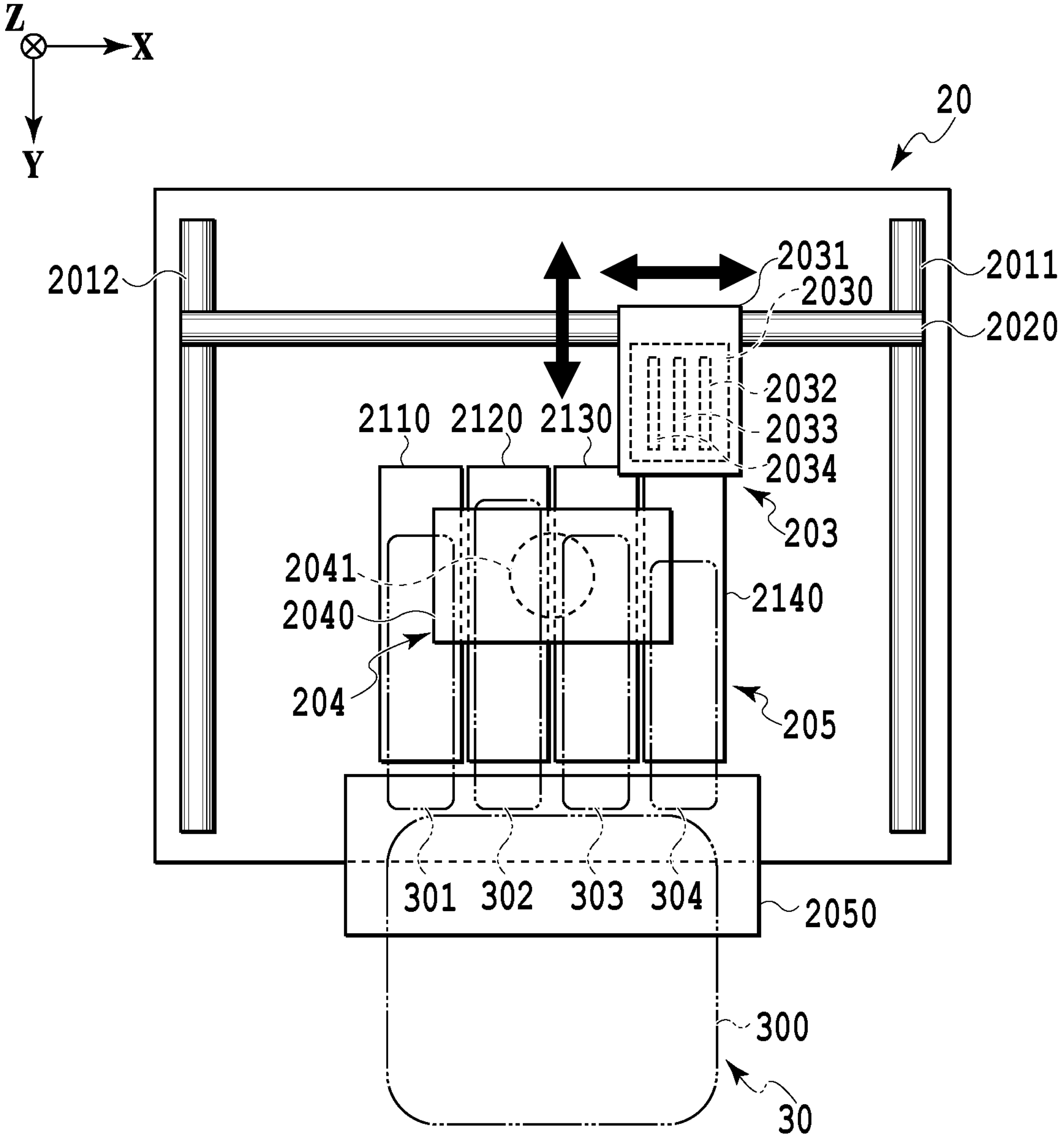
FIG. 1 is a top view showing an outline of a configuration of a nail printing apparatus.
Figure 2:
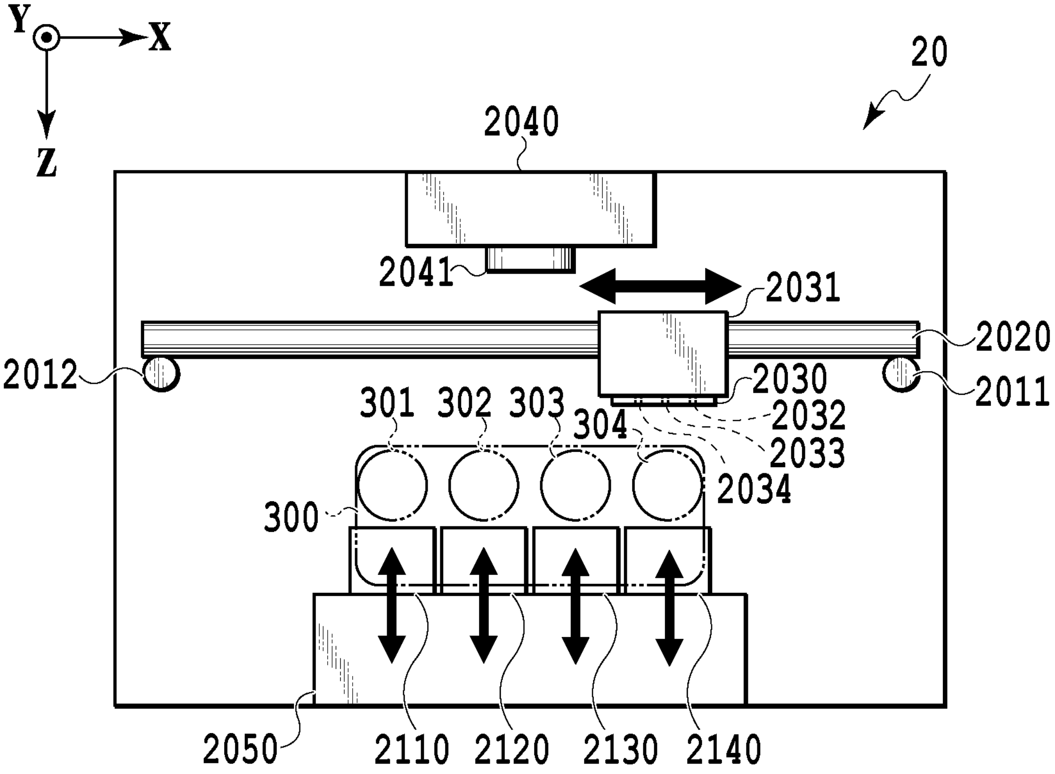
FIG. 2 is a front view showing the outline of the configuration of the nail printing apparatus.
Figure 3:
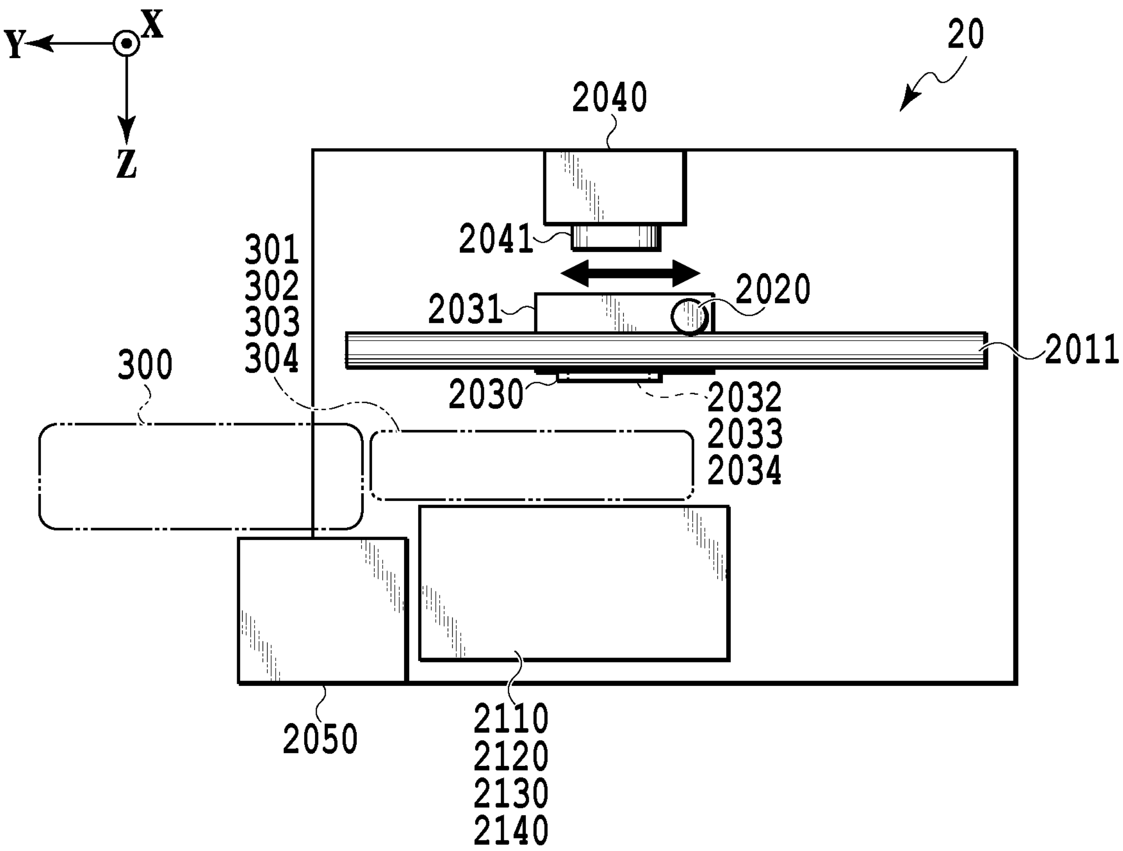
FIG. 3 is a right side view showing the outline of the configuration of the nail printing apparatus.

FIG. 1 is a top view showing an outline of a configuration of a nail printing apparatus 20. FIG. 2 is a front view showing the outline of the configuration of the nail printing apparatus 20. FIG. 3 is a right side view showing the outline of the configuration of the nail printing apparatus 20. FIGS. 1 to 3 show an example of the nail printing apparatus 20 in a state where a housing (not shown) is removed. In FIGS. 1 to 3, a +Y direction shows a front side, a −Y direction shows a back side (rear side), a +X direction shows a right side, a −X direction shows a left side, a +Z direction shows a lower side, and a −Z direction shows an upper side. A Z axis corresponds to a gravitational direction.

The nail printing apparatus 20 is configured to eject ink (liquid) to a nail which is a print medium under an inkjet system to print a nail design. A finger whose nail is to be printed will be referred to as a printing finger. The nail printing apparatus 20 includes a print unit 203 configured to perform printing on a nail and a hand-disposing unit 205 capable of relatively moving the nail to the print unit 203 in a Z direction. That is, the hand-disposing unit 205 can be elevated and lowered with the printing finger placed thereon. Further, the nail printing apparatus 20 has a photographing unit 204 configured to photograph a printing finger from above to recognize the position of the nail in an XY direction. The entire operations of the nail printing apparatus 20 are controlled by a control unit 40 (see FIG. 4).

<Print Unit>

The print unit 203 includes a carriage 2031 on which a print head 2030 is mounted. The print head 2030 has the following ink ejection nozzles: a cyan ink ejection nozzle 2032; a magenta ink ejection nozzle 2033; and a yellow ink ejection nozzle 2034. The print head 2030 ejects ink supplied from an ink tank (not shown) mounted on the carriage 2031 using the above ink ejection nozzles.

The carriage 2031 and the print head 2030 mounted on the carriage 2031 are provided relatively movably at least in the XY direction with respect to a hand-disposing unit 205 described later. Detailed descriptions will be given. The nail printing apparatus 20 includes Y-direction rail guides 2011, 2012 and an X-direction rail guide 2020. The Y-direction rail guides 2011 and 2012 extend in the Y direction and are used to move the carriage 2031 in a longitudinal direction. The X-direction rail guide 2020 extends in an X direction intersecting (orthogonal to in the present embodiment) the Y direction and is used to move the carriage 2031 in a lateral direction. The carriage 2031 and the print head 2030 can move in the XY direction along the Y-direction rail guides 2011, 2012 and the X-direction rail guide 2020 by using two motors (not shown).

In the case of performing printing, the print unit 203 ejects ink to the nail which is a print medium while moving the print head 2030 in the X direction to perform a print operation of printing an image for one scan. Then, after performing a moving operation of moving the print head 2030 by a predetermined amount in the Y direction, the print operation is performed again. Thus, in the nail printing apparatus 20, an image is printed on a nail by alternately and repeatedly executing the print operation and the moving operation. Accordingly, in the nail printing apparatus 20, the position of the nail which is a print medium (to be printed) is not moved during printing, and the print unit 203 performs printing on the nail while changing the position in the XY direction with respect to the print medium.

<Photographing Unit>

The photographing unit 204 includes a camera 2040 for photographing a finger, the camera 2040 being installed inside a ceiling portion of the nail printing apparatus 20. A photographing lens 2041 is arranged at the bottom of the camera 2040. The photographing unit 204 may be installed in the nail printing apparatus 20 or may be, for example, a smartphone with a camera function attached separately by a user. The photographing unit 204 performs photographing in a state where a hand is disposed on the hand-disposing unit 205, so that an approximate position of the nail which is a print medium can be specified.

<Hand-Disposing Unit>

The hand-disposing unit 205 includes a palm-disposing unit 2050 on which a palm is placed, the palm-disposing unit being arranged on the bottom surface (lower side) of the nail printing apparatus 20, and printing-finger fixation units 2110, 2120, 2130, 2140 described later for fixing a finger. The hand-disposing unit 205 can be pulled out from the nail printing apparatus 20 toward the front side (in the +Y direction) or pushed into the nail printing apparatus 20 (in the −Y direction) from the state of being pulled out. The user pulls out the hand-disposing unit 205 from the nail printing apparatus 20 toward the front side (in the +Y direction) and disposes a hand on the pulled-out hand-disposing unit 205. At this time, as will be described later, the user performs an operation of aligning the position of the finger in the printing-finger fixation unit. Then, the user pushes the hand-disposing unit 205 into the nail printing apparatus 20 in a state where the printing finger is disposed on the hand-disposing unit 205 to elevate the printing-finger fixation unit, so that the nail portion which is a print medium can be positioned in a print area which can be printed by the print unit 203.

FIGS. 1 to 3 also schematically show an example in which the user's hand and fingers are inserted into the nail printing apparatus 20. Specifically, an example is shown in which the user's right hand 30 is disposed on the hand-disposing unit 205. A palm 300 of the right hand 30 is disposed on the palm-disposing unit 2050. A right index finger 301, a right middle finger 302, a right ring finger 303, and a right little finger 304 are disposed on the printing-finger fixation units 2110, 2120, 2130, 2140, respectively. The details of the finger fixation units will be described later.

As described above, the hand-disposing unit 205 of the present embodiment is provided with the printing-finger fixation units 2110, 2120, 2130, 2140 corresponding to four fingers. In a case where printing is intended to be performed on a nail on a thumb of the right hand 30, the user disposes a right thumb (not shown) on the printing-finger fixation unit 2140. On the other hand, in a case where printing is intended to be performed on a nail of the left hand, a left index finger, a left middle finger, a left ring finger, and a left little finger are disposed on the printing-finger fixation units 2140, 2130, 2120, 2110, respectively, in reverse order to the case of the right hand. In a case where printing is intended to be performed on a thumb of the left hand, the user disposes a left thumb on the printing-finger fixation unit 2110. The thumbs of both hands may be disposed on the printing-finger fixation units 2110, 2140, respectively. Thus, since a finger to dispose may change even in the case of a single user, the length of a printing finger to be disposed on the printing-finger fixation unit may change. Additionally, the lengths of fingers differ among users. In this embodiment, even in a case where the lengths of fingers differ among users and fingers as described above, an image (nail design) can be printed on a nail accurately. The details will be described later.

This embodiment shows an example in which the printing-finger fixation units corresponding to four fingers are provided, but it is only required that one or more printing-finger fixation units corresponding to one or more fingers be provided. Providing printing-finger fixation units corresponding to a plurality of fingers as in the present embodiment enables printing nail designs collectively on a plurality of nails.

<Control Unit>

Figure 4:
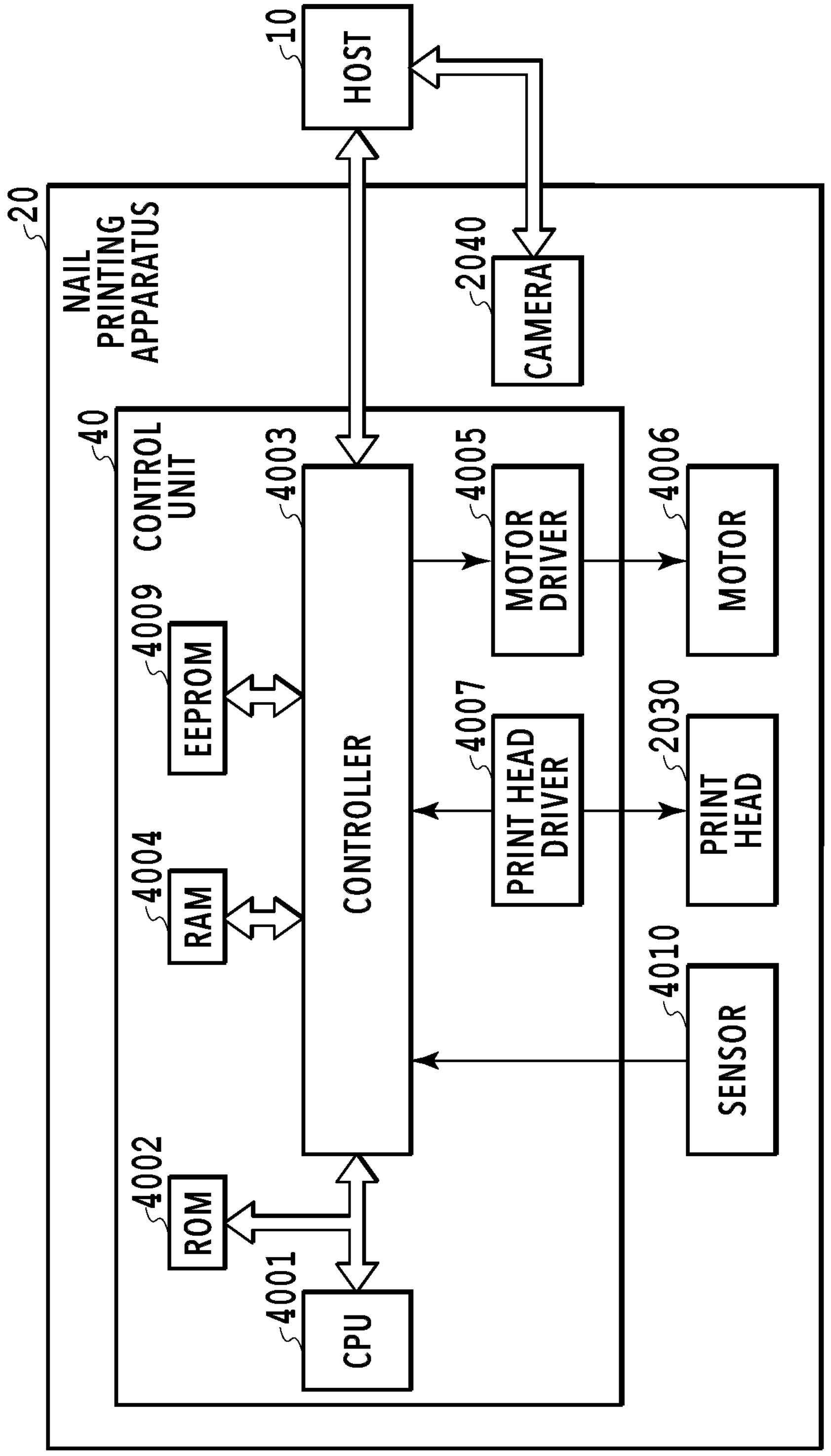
FIG. 4 is a block diagram showing a schematic configuration of the nail printing apparatus.

FIG. 4 is a block diagram showing a schematic configuration of the nail printing apparatus 20. As shown in FIG. 4, the nail printing apparatus 20 includes the control unit 40, the print head 2030, the camera 2040, a motor 4006, and a sensor 4010. The nail printing apparatus 20 can communicate with a host 10 such as a computer, a smartphone, or a tablet.

The control unit 40 includes a CPU 4001, a ROM 4002, a controller 4003, a RAM 4004, a motor driver 4005, a print head driver 4007, and an EEPROM 4009.

The CPU (central processing unit) 4001 controls each mechanism in the nail printing apparatus 20 via the controller 4003 in accordance with various programs stored in the ROM 4002. The ROM 4002 stores the various programs. The RAM 4004 is used as a work area for temporarily storing various types of data and executing processing. The CPU 4001 performs image processing for converting image data received from the host 10 into a print signal which can be printed with the nail printing apparatus 20. The CPU 4001 then drives the motor 4006 via the motor driver 4005 and drives the print head 2030 via the print head driver 4007 based on image-processed information and the like to print an image on a print medium. In FIG. 4, to facilitate understanding, various motors in the nail printing apparatus 20 are shown by the motor 4006, and motor drivers that drive respective motors are shown as the motor driver 4005.

The control unit 40 also includes the EEPROM 4009 which can be electrically written. The EEPROM 4009 stores various setting values or data to be updated. The data stored in the EEPROM 4009 is used as a control parameter by the controller 4003 or the CPU 4001. In FIG. 4, to facilitate understanding, various sensors such as an encoder sensor provided in the nail printing apparatus 20 are shown as a sensor 4010. The CPU 4001 increments, for example, count information obtained by counting slits by the encoder sensor to put it into a ring buffer in the RAM 4004 at any time. The CPU 4001 performs various types of control based on the information obtained with the sensor 4010.

The camera 2040 is connected to the host 10. The host 10 performs image processing relating to position information on the nail based on the image information obtained with the camera 2040. The CPU 4001 performs various types of control based on the position information on the nail obtained from the host 10.

It should be noted that FIG. 4 shows a schematic configuration, and other configurations may be included. Further, although FIG. 4 shows an example in which the nail printing apparatus 20 and the host 10 are separate apparatuses, the host 10 may be incorporated into the nail printing apparatus 20.

<Printing-Finger Fixation Unit>

Figure 5:
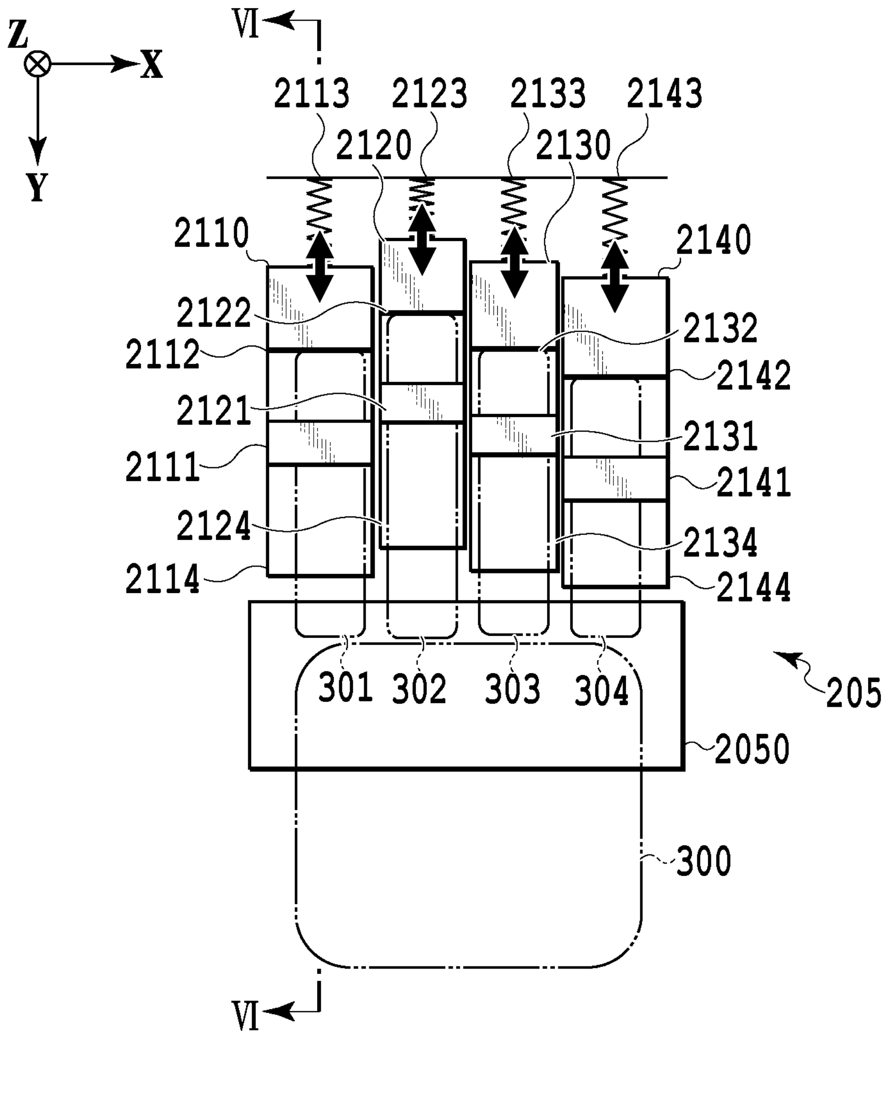
FIG. 5 is a top view showing a schematic configuration of a hand-disposing unit.
Figure 6:
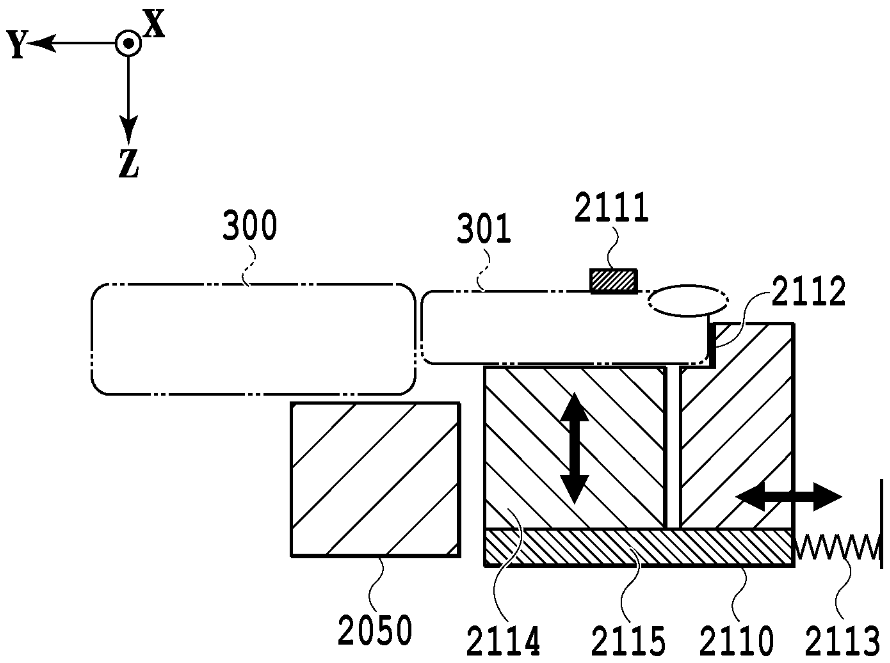
FIG. 6 is a cross-sectional view showing an outline of a printing-finger fixation unit.

FIG. 5 is a top view showing a schematic configuration of the hand-disposing unit 205. FIG. 6 is a cross-sectional view showing an outline of the printing-finger fixation unit 2110. The configuration of the printing-finger fixation unit will be described with reference to FIGS. 5 and 6. As shown in FIG. 5, the hand-disposing unit 205 includes the four printing-finger fixation units 2110, 2120, 2130, 2140 corresponding to four fingers. A description will be given below with a focus on the printing-finger fixation unit 2110. The other printing-finger fixation units 2120, 2130, 2140 also have an equivalent configuration.

The printing-finger fixation unit 2110 is a portion for fixing the finger 301 (in the present example, the finger 301 is the right index finger 301, but for the sake of brevity, it is simply referred to as a "finger"). The printing-finger fixation unit 2110 includes a finger-pressing member 2111 that is to cover at least a portion of the finger 301 except the nail portion, an abutting member 2112 on which a near-tip portion of the finger 301 is to abut, a finger-disposing unit 2114 on which a finger is to be disposed, and a pedestal 2115. As described above, the hand-disposing unit 205 including the printing-finger fixation unit 2110 and the palm-disposing unit 2050 can be pulled out from the nail printing apparatus 20 toward the front side (in the +Y direction) or can be pushed into the nail printing apparatus 20 (in the −Y direction) from the state of being pulled out. That is, the printing-finger fixation unit 2110 and the palm-disposing unit 2050 can integrally move to the front side and the back side of the nail printing apparatus 20.

A motor (not shown) is provided inside the finger-disposing unit 2114 and has a mechanism for elevating and lowering the finger-disposing unit 2114. It is not always necessary to use a motor to elevate and lower the finger-disposing unit 2114. For example, the finger-disposing unit 2114 may be elevated and lowered with a biasing member such as a spring. In the case of performing printing on a nail, it is required that the nail be arranged in a fixed position relative to the print head 2030. This is because in a case where a distance from the ejection nozzle in the print head 2030 to the nail which is a print medium is longer than a predetermined distance, print accuracy may not be increased. Thus, in a case where printing is performed, the finger-disposing unit 2114 is elevated to a fixed position with a motor (not shown) or the like.

The abutting member 2112 is a member provided in a position on which the near-tip portion of the finger 301 is to abut. In the present embodiment, the finger 301 is aligned with the printing-finger fixation unit 2110. The abutting member 2112 is a member used for the alignment of the finger. In the case of performing printing on a nail, it is required that the nail be exposed. On the other hand, since printing is performed in a state where the print head 2030 is close to the nail as described above, it is necessary to suppress an unexpected operation by the user. In order to suppress such an unexpected operation of the user, the finger-pressing member 2111 is provided on an upper portion of the finger-disposing unit 2114 (the −Z direction side). An opening is formed between the abutting member 2112 and the finger-pressing member 2111 when viewed from the print head 2030 (above). The print head 2030 performs printing on the nail exposed in the opening portion. Then, in order to position the opening portion (nail portion) which may differ depending on the length of a finger, the finger 301 and the printing-finger fixation unit 2110 are aligned.

In the present embodiment, as shown in FIG. 6, the abutting member 2112 can abut a tip of a finger pad. That is, the abutting member 2112 is a member projecting upward (in the −Z direction) in a position on an end side in the insertion direction of a finger (−Y direction) in the printing finger fixation unit 2110 so as to restrict the progress of the finger 301 in the insertion direction. Additionally, the abutting member 2112 is provided so as to project in a position lower than the position where at least the finger-pressing member 2111 is provided. In general, a base or the like may be applied to the nail before the nail is printed. With such an abutting member 2112, in a case where the finger 301 is inserted into the printing-finger fixation unit 2110, the finger 301 can be abutted without damaging an application portion on the nail to which the base or the like is applied. Since the abutting member 2112 can abut the tip of the finger pad, it is possible to suppress the nail from being unsuccessfully printed up to an edge portion of the nail due to the nail abutting the abutting member 2112.

In FIG. 6, the shape of a portion at the position where the finger abuts in the abutting member 2112 is schematically shown as a right-angled shape, but may be a curved-surface shape. Further, a proximal region where the finger is to abut in the abutting member 2112 may be inclined at a predetermined angle from the horizontal direction (inclined upward).

In the present embodiment, the abutting member 2112 is attached so that the abutting member 2112 can slide in the insertion direction of the printing finger (−Y direction). Thus, the finger-disposing unit 2114 slides in synchronization with the slide of the abutting member 2112. In the present embodiment, the abutting member 2112 and the finger-disposing unit 2114 are attached to the pedestal 2115 on the printing-finger fixation unit 2110. As the abutting member 2112 slides, the pedestal 2115 slides, and the finger-disposing unit 2114 also slides due to the slide of the pedestal 2115. Such a configuration enables holding a relative distance from the near-tip portion of the finger to the finger-disposing unit 2114 constant. The relative distance from the near-tip portion of the finger to the finger-disposing unit 2114 is held constant, so that the print accuracy at the time of printing can be increased.

A description will be given below of the fact that the relative distance from the near-tip portion of the finger to the finger-disposing unit 2114 is held constant, so that the print accuracy at the time of printing can be increased. As described above, the finger-disposing unit 2114 elevates and lifts the finger to a fixed position in a case where printing is performed. Then, as a comparative example, the case of using a configuration in which the abutting member 2112 slides while the finger-disposing unit 2114 does not slide is presumed. In this case, the position and posture of the nail may be unstable in a case where the finger-disposing unit 2114 is elevated. For example, a first case where the abutting member is slid with a finger of a first length and a second case where the abutting member is slid with a finger whose length is shorter than the first length are presumed. In a case where the finger-disposing unit 2114 is elevated, the posture of the nail is inclined more downward in the first case as compared with the second case. This is because the portion of the finger lifted by the finger-disposing unit 2114 is positioned closer to the base of the finger in the first case than in the second case. As described above, in a case where printing is performed in a state where the position and posture of the nail are unstable, there is a possibility that print accuracy decreases. Thus, it is preferable that the finger-disposing unit 2114 elevate and lower a portion as close to the nail portion as possible of the finger 301.

As described above, the printing-finger fixation unit 2110 of the present embodiment slides the finger-disposing unit 2114 configured to elevate and lower a finger by the same movement amount in synchronization with the slide of the abutting member 2112. That is, the abutting member 2112 and the finger-disposing unit 2114 slide integrally. As a result, a relative distance between the abutting member 2112 and the finger-disposing unit 2114 is held constant regardless of the length of a finger to be inserted. That is, the position of a finger elevated and lowered by the finger-disposing unit 2114 is in the vicinity of a nail portion regardless of the length of the finger to be inserted. Thus, using the printing-finger fixation unit 2110 of the present embodiment enables elevating and lowering near-nail-portion parts of fingers of different lengths.

In the present embodiment, the finger-pressing member 2111 also slides in synchronization with the slide of the abutting member 2112. In the present embodiment, the finger-pressing member 2111 is also attached to the pedestal 2115 on the printing-finger fixation unit 2110. As the abutting member 2112 slides, the pedestal 2115 slides, and the finger-pressing member 2111 also slides due to the slide of the pedestal 2115.

Thus, in the present embodiment, the relative distance between the abutting member 2112 and the finger-disposing unit 2114 and the relative distance between the abutting member 2112 and the finger-pressing member 2111 are held constant by a slide. Here, the relative distances themselves may be adjustable. For example, changing an attachment position where the abutting member 2112 is attached to the pedestal 2115 enables changing the relative distance between the abutting member 2112 and the finger-disposing unit 2114 or the finger-pressing member 2111. The attachment position of the finger-disposing unit 2114 or the finger-pressing member 2111 may also be changed without changing the attachment position of the abutting member 2112. Alternatively, the attachment position of any or each of the abutting member 2112, the finger-disposing unit 2114, and the finger-pressing member 2111 may be changed. The attachment positions can be changed with the hand-disposing unit 205 pulled out from the nail printing apparatus 20.

The printing-finger fixation unit 2110 includes a biasing member 2113. The printing-finger fixation unit 2110 is biased by the biasing member 2113 in a direction opposite to the insertion direction of the finger 301 (in the +Y direction). That is, the printing-finger fixation unit 2110 is biased so as to approach the palm-disposing unit 2050. With such a configuration, the printing-finger fixation unit 2110 returns to a front position (in the +Y direction) in a case where the finger 301 is pulled out. That is, so to speak, the printing-finger fixation unit 2110 returns to a position in an initial state. In a case where another finger is inserted in this state by inserting a left hand instead of a right hand, the other finger, or another user's hand, the print finger fixation unit 2110 slides in the −Y direction again. Then, the printing finger is positioned with respect to the printing-finger fixation unit 2110.

In the present embodiment, as an example, the description has been given of the operation in which the user fixes a finger to the printing-finger fixation unit 2110 with the hand-disposing unit 205 pulled out from the nail printing apparatus 20, and then the hand-disposing unit 205 is pushed into the nail printing apparatus 20, but the present invention is not limited to this. With the hand-disposing unit 205 accommodated in the nail printing apparatus 20, the user may insert the finger into the printing-finger fixation unit 2110 to position the printing finger to the printing-finger fixation unit 2110.

The printing-finger fixation unit 2110 is described above as an example, and the same applies to the other printing-finger fixation units. That is, in a case where the finger 302 is inserted into the printing-finger fixation unit 2120 and the printing-finger fixation unit 2120 slides, relative distances between the abutting member 2122 on the one hand and the finger-disposing unit 2124 and the finger-pressing member 2121 on the other hand are held constant. In a case where the finger 303 is inserted into the printing-finger fixation unit 2130 and the printing-finger fixation unit 2130 slides, relative distances between the abutting member 2132 on the one hand and the finger-disposing unit 2134 and the finger-pressing member 2131 on the other hand are held constant. In a case where the finger 304 is inserted into the printing-finger fixation unit 2140 and the printing-finger fixation unit 2140 slides, relative distances between the abutting member 2142 on the one hand and the finger-disposing unit 2144 and the finger-pressing member 2141 on the other hand are held constant.

The printing-finger fixation unit 2120 includes a biasing member 2123 and is biased by the biasing member 2123 in a direction opposite to the insertion direction of the finger 302 (in the +Y direction). The printing-finger fixation unit 2130 includes a biasing member 2133 and is biased by the biasing member 2133 in a direction opposite to the insertion direction of the finger 303 (in the +Y direction). The printing-finger fixation unit 2140 includes a biasing member 2143 and is biased by the biasing member 2143 in a direction opposite to the insertion direction of the finger 304 (in the +Y direction). Incidentally, FIGS. 5 and 6 show an example in which a biasing member is provided opposite to the palm-disposing unit 2050, but the biasing member may be provided on a palm-disposing unit 2050 side.

Thus, the printing-finger fixation units 2110, 2120, 2130, and 2140 can slide independently of each other. Further, the example has been described in which the number of printing finger fixation units is four, but the number of printing finger fixation units is not limited to four in the present invention.

Outer fingers (at both ends) are disposed so as to open more outward than the inner fingers do. Thus, in a case where the four printing-finger fixation units are arranged parallel with each other, it may be difficult to dispose the fingers at both ends. This is a prominent tendency for persons with small hands. Therefore, in the present embodiment, the widths of the finger-disposing units 2114 and 2144 provided in the printing-finger fixation units 2110 and 2140, which are printing-finger fixation units at both ends, are larger than the widths of the inner finger-disposing units 2124 and 2134. As a result, the fingers can also be appropriately disposed on the finger-disposing units 2114 and 2144 even in a state where the fingers at both ends are open, and it is possible to handle hands of various sizes. The widths of the outer finger-disposing unit 2114 and the finger-disposing unit 2144 may be the same or different. The widths of the inner finger-disposing unit 2124 and the finger-disposing unit 2134 may also be the same or different.

As described above, in the present embodiment, in a case where the user inserts the finger 302, the abutting member 2112 on which the finger 302 abuts slides depending on the length of the finger. In synchronization with the slide of the abutting member 2112, the finger-disposing unit 2114 configured to elevate and lower a finger also slides by the same movement amount. Thus, the relative distance between the abutting member 2112 and the finger-disposing unit 2114 is held constant regardless of the length of a finger to be inserted. As a result, using the printing-finger fixation unit 2110 of the present embodiment enables elevating and lowering the near-nail-portion parts of fingers of different lengths. Additionally, since such a slide is performed independently in each of the plurality of printing-finger fixation units, the near-nail-portion parts of fingers of different lengths can be elevated and lowered. Thus, it is possible to increase print accuracy in the case of performing printing on a nail.

Second Embodiment

In the first embodiment, the example has been described of the nail printing apparatus in which each of the printing-finger fixation units is arranged parallel with the insertion direction of a finger (the −Y direction). In the present embodiment, an example will be described of a nail printing apparatus in which some printing-finger fixation units are not arranged parallel with the Y direction. In the present embodiment, since the printing-finger fixation units 2110, 2120, 2130, 2140 are different from those in the nail printing apparatus in the first embodiment, differences will be described in detail below and descriptions of commonalities will be omitted.

<Printing-Finger Fixation Unit>

Figure 7:
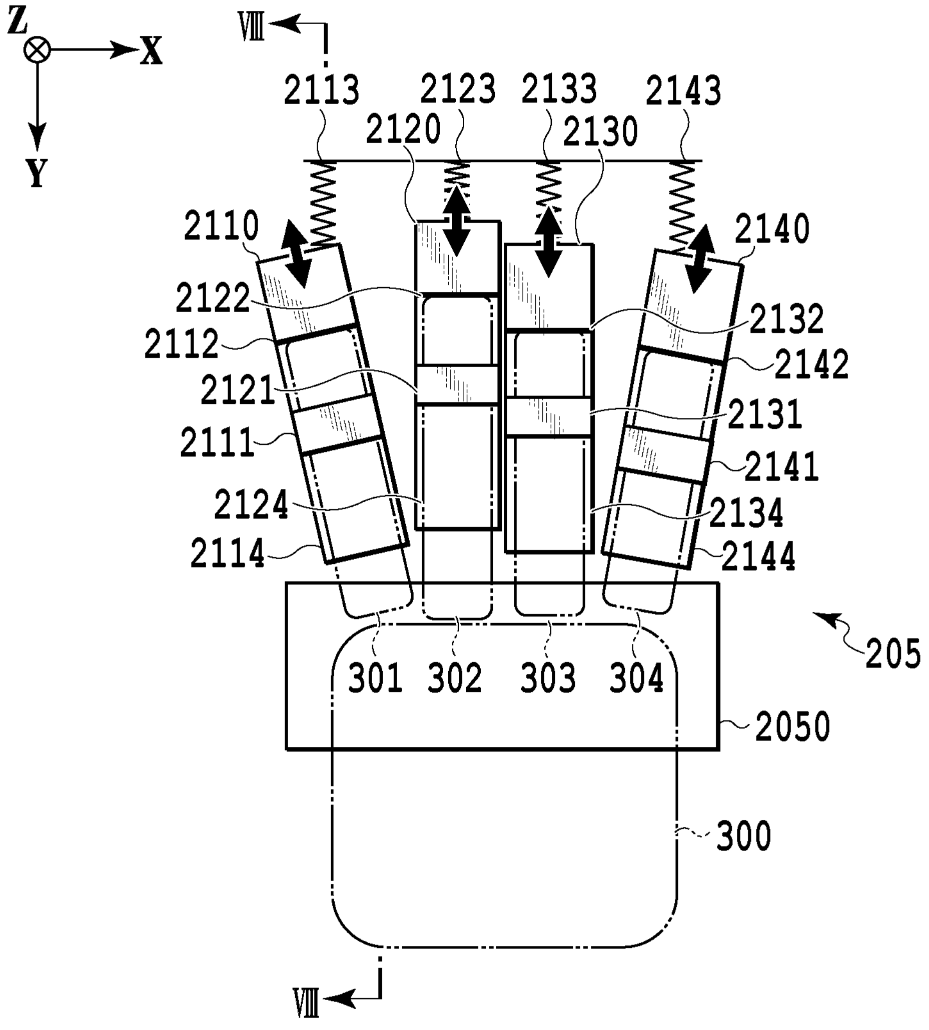
FIG. 7 is a top view showing a schematic configuration of the hand-disposing unit.

FIG. 7 is a top view showing a schematic configuration of the hand-disposing unit 205 of the present embodiment. As shown in FIG. 7, in the nail printing apparatus of the present embodiment, the printing-finger fixation units 2110 and 2140, which are printing-finger fixation units at both ends, are arranged at angles with respect to the printing-finger fixation units 2120 and 2130. In the present embodiment, the printing-finger fixation units 2120 and 2130 are arranged parallel with the Y direction. On the other hand, the printing-finger fixation units 2110 and 2140 are arranged at angles so as to open outward with respect to the −Y direction so as to correspond to the insertion directions of outer fingers. As a result, fingers can also be appropriately disposed on the printing-finger fixation units 2110 and 2140 in a state where the user's fingers at both ends are open, and it is possible to handle hands of various sizes. FIG. 7 shows an example in which the widths of the printing-finger fixation units are substantially the same, but the widths of the printing finger fixation units may be different. Further, as shown in FIG. 5 for the first embodiment, the widths of the finger-disposing units 2114 and 2144 provided in the printing-finger fixation units 2110 and 2140, which are outer printing-finger fixation units (at both ends), may be larger than the widths of the inner finger-disposing units 2124 and 2134.

Third Embodiment

In the first embodiment, the example has been described of the nail printing apparatus in which the abutting member 2112 and the finger-disposing unit 2114 are formed as separate members. In the present embodiment, an example will be described in which the abutting member 2112 and the finger-disposing unit 2114 are integrated. In the present embodiment, since the printing-finger fixation units 2110, 2120, 2130, 2140 are different from those in the nail printing apparatus in the first embodiment, differences will be described in detail below and descriptions of commonalities will be omitted.

<Printing-Finger Fixation Unit>

Figure 8:
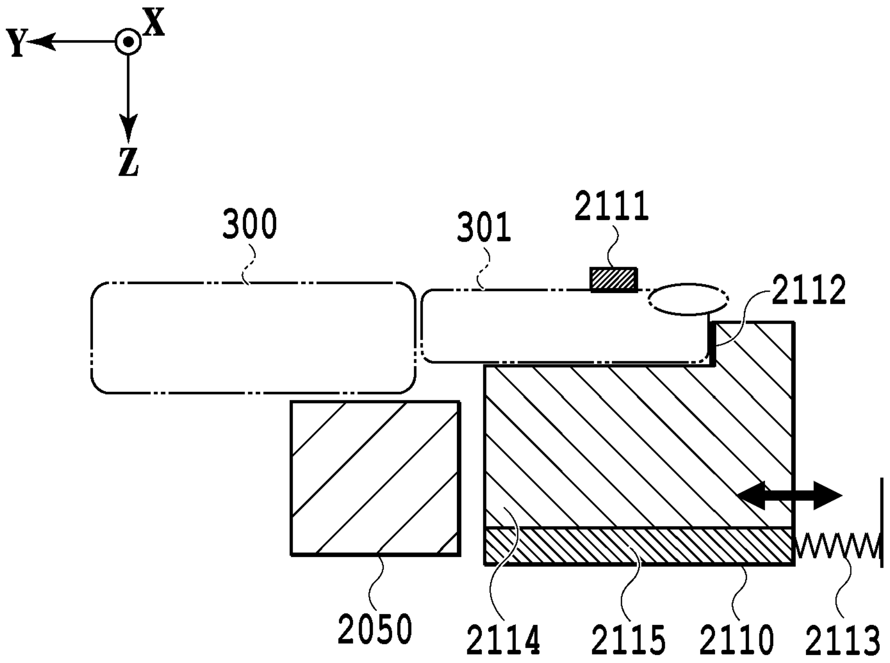
FIG. 8 is a cross-sectional view showing an outline of the printing-finger fixation unit.

FIG. 8 is a cross-sectional view showing an outline of the printing-finger fixation unit 2110 of the present embodiment. As shown in FIG. 8, the printing-finger fixation unit 2110 in the present embodiment includes the abutting member 2112 on the finger-disposing unit 2114. This makes it possible to hold a relative distance between the abutting member 2112 and the finger-disposing unit 2114 constant in a case where the abutting member 2112 slides, as described in the first embodiment. That is, the abutting member 2112 and the finger-disposing unit 2114 also move integrally in this embodiment. FIG. 8 gives a description by taking the printing-finger fixation unit 2110 as an example, but the other printing-finger fixation units can also be configured similarly.

Some of the printing-finger fixation units may include the abutting member and the finger-disposing unit as separate members as described in the first embodiment, and the other printing-finger fixation units may be integrated as described in the present embodiment.

As described in the second embodiment, the printing-finger fixation unit of the present embodiment may be arranged at an angle with respect to the insertion direction of a finger (the −Y direction).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-064098, filed Apr. 5, 2021, which is hereby incorporated by reference herein in its entirety.

What is claimed is:

1. A nail printing apparatus comprising:

a finger-placement unit on which a printing finger is to be placed, with the printing finger being a finger with a nail portion on which printing an image is to be performed, with the finger-placement unit capable of being elevated and lowered;

an abutting member configured to, in a case where the printing finger is inserted, abut a near-tip portion of the inserted printing finger; and a print unit configured to perform printing on the nail portion, wherein in a case where the printing finger is inserted, the finger-placement unit and the abutting member slide integrally in an insertion direction of the printing finger, and a distance between the finger-placement unit and the abutting member remains constant while the finger-placement unit and the abutting member slide.

2. The nail printing apparatus according to claim 1, further comprising a biasing unit configured to bias the finger-placement unit and the abutting member in a direction opposite to the insertion direction of the printing finger.

3. The nail printing apparatus according to claim 1, wherein the distance between the finger-placement unit and the abutting member remains constant in a case where insertion of the printing finger causes the finger-placement unit and the abutting member to slide.

4. The nail printing apparatus according to claim 1, further comprising a plurality of finger-placement units arranged in an array and a plurality of abutting members are provided corresponding to a plurality of printing fingers, each of the finger-placement units and the abutting members being slidable independently.

5. The nail printing apparatus according to claim 4, wherein the finger-placement units arranged at an outer periphery of the array of the plurality of finger-placement units have widths larger than the finger-placement units arranged at an interior of the array of the plurality of finger disposing units.

6. The nail printing apparatus according to claim 4, wherein the finger-placement units arranged at an outer periphery of the array of the plurality of finger-placement units are arranged at angles such that an insertion direction of a finger is oriented outward with respect to orientation of the finger-placement units arranged at an interior of the array of the plurality of finger-placement units.

7. The nail printing apparatus according to claim 1, wherein relative positions of the finger-placement unit and the abutting member are adjustable.

8. The nail printing apparatus according to claim 1, wherein the abutting member and the finger-placement unit are integrated.

9. The nail printing apparatus according to claim 1, further comprising a finger-pressing member configured to cover at least a portion of an area except the nail portion.

10. The nail printing apparatus according to claim 9, wherein the finger-pressing member slides in synchronization with a slide of the abutting member.

11. The nail printing apparatus according to claim 9, wherein a relative distance between the finger-pressing member and the abutting member is held constant even in a case where a slide in response to an insertion of the printing finger occurs.

12. The nail printing apparatus according to claim 9, wherein relative positions of the abutting member and the finger-pressing member are adjustable.

13. The nail printing apparatus according to claim 1, wherein the print unit is configured to perform printing on the nail portion in a state where the finger-placement unit is elevated.

14. The nail printing apparatus according to claim 1, wherein in a case where the printing finger is inserted, the finger-placement unit and the abutting member slide integrally in the insertion direction of the printing finger.

15. A hand-disposing assembly for a nail printing apparatus, comprising:

a finger-placement unit on which a printing finger is to be placed, with the printing being a finger with a nail portion on which printing an image is to be performed and which is capable of being elevated and lowered;

an abutting member configured to, in a case where the printing finger is inserted, abut a near-tip portion of the inserted printing finger, wherein in a case where the printing finger is inserted, the finger-placement unit and the abutting member slide integrally in an insertion direction of the printing finger, and a distance between the finger-placement unit and the abutting member remains constant while the finger-placement unit and the abutting member slide.

16. The hand-disposing assembly according to claim 15, further comprising a biasing unit configured to bias the finger-placement unit and the abutting member in a direction opposite to the insertion direction of the printing finger.

17. The hand-disposing assembly according to claim 15, wherein a plurality of finger-placement units and a plurality of abutting members are provided corresponding to a plurality of printing fingers, each of the finger-placement units and the abutting members being slidable independently.

18. The hand-disposing assembly according to claim 15, further comprising a finger-pressing member configured to cover at least a portion of an area except the nail portion.

19. The hand-disposing assembly according to claim 18, wherein the finger-pressing member slides in synchronization with a slide of the abutting member.

20. The nail printing apparatus according to claim 1, wherein the finger-placement unit receives an underside of the printing finger, opposite to a top side of the finger having the nail portion.

* * * * *